(12) United States Patent
Chang et al.

(10) Patent No.: US 9,021,238 B2
(45) Date of Patent: Apr. 28, 2015

(54) SYSTEM FOR ACCESSING A REGISTER FILE USING AN ADDRESS RETRIEVED FROM THE REGISTER FILE

(75) Inventors: Xiao Tao Chang, Beijing (CN); Qiang Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/372,103

(22) Filed: Feb. 13, 2012

(65) Prior Publication Data

US 2012/0144163 A1    Jun. 7, 2012

Related U.S. Application Data

(62) Division of application No. 12/469,854, filed on May 21, 2009, now Pat. No. 8,151,091.

(30) Foreign Application Priority Data

May 28, 2008    (CN) .......................... 2008 1 0098475

(51) Int. Cl.
| | |
|---|---|
| G06F 7/38 | (2006.01) |
| G06F 9/00 | (2006.01) |
| G06F 9/44 | (2006.01) |
| G06F 15/00 | (2006.01) |
| G06F 9/35 | (2006.01) |
| G06F 9/30 | (2006.01) |
| G06F 9/38 | (2006.01) |

(52) U.S. Cl.
CPC .............. *G06F 9/35* (2013.01); *G06F 9/30098* (2013.01); *G06F 9/382* (2013.01)

(58) Field of Classification Search
None
See application file for complete search history.

(56) References Cited

U.S. PATENT DOCUMENTS

| | | | |
|---|---|---|---|
| 5,875,483 A | 2/1999 | Tremblay | |
| 5,890,222 A * | 3/1999 | Agarwal et al. | ............... 711/220 |
| 5,995,727 A | 11/1999 | Wise et al. | |
| 6,687,808 B2 | 2/2004 | Sugimoto | |
| 6,735,664 B1 | 5/2004 | Keller | |
| 7,383,420 B2 * | 6/2008 | Plondke et al. | ............... 711/220 |
| 2003/0028754 A1 | 2/2003 | Sugimoto | |
| 2006/0218373 A1 * | 9/2006 | Plondke et al. | ............... 711/220 |
| 2006/0256854 A1 | 11/2006 | Jiang | |

FOREIGN PATENT DOCUMENTS

CN            101030192 A      5/2010

OTHER PUBLICATIONS

Jayasena, Nuwan, et al., "Stream Register Files with Indexed Access", Source: http://merrimac.stanford.edu/publications/hpca04_indexedSRF.pdf; pp. 1-12.

* cited by examiner

*Primary Examiner* — Corey S Faherty
(74) *Attorney, Agent, or Firm* — Suiter Swantz pc llo (57) ABSTRACT

A data processing system and method are disclosed. The system comprises an instruction-fetch stage where an instruction is fetched and a specific instruction is input into decode stage; a decode stage where said specific instruction indicates that contents of a register in a register file are used as an index, and then, the register file pointed to by said index is accessed based on said index; an execution stage where an access result of said decode stage is received, and computations are implemented according to the access result of the decode stage.

12 Claims, 7 Drawing Sheets

SYSTEM FOR ACCESSING A REGISTER FILE USING AN ADDRESS RETRIEVED FROM THE REGISTER FILE

CROSS-REFERENCE TO RELATED APPLICATIONS

The present application claims the benefit under 35 U.S.C. §119 of China; Application Serial Number 200810098475.3, filed May 28, 2008 entitled "Data Processing Method and System Based on Pipeline" which is incorporated herein by reference.

The present application is a Divisional of U.S. application Ser. No. 12/469,854, filed May 21, 2009, now allowed. Said U.S. application Ser. No. 12/469,854 is hereby incorporated by reference in its entirety.

FIELD OF THE INVENTION

The present invention relates to the data processing field in computer systems, and more particularly to a data processing method and system based on pipeline.

BACKGROUND OF THE INVENTION

Usually, there is a memory hierarchy in a computer system. Generally speaking, the memory hierarchy is composed of multi-level memories. The memory in a higher level of the memory hierarchy usually has the properties of higher speed, smaller size and lower latency than those in lower levels. Generally, "level one" registers are located in the proximity of the processor in a data processing system. "Level two" caches are lower than "level one" registers, but still in the proximity of the processor in the data processing system. "Level three" caches have capacities for storing more data, but needs longer time to access. Further, there can be random access memories (RAM), hard disk drivers, tape backups and the like below these three levels.

In existing computer systems, a traditional method to access a register in a register file is through the binary instruction or the assembly language. Such binary instructions have designated fields, called source/destination register indexes, for accessing explicitly to a register in the register file. When being encoded in a binary instruction format, register indexes are filled with binary instructions. When these instructions are loaded into the processor for executing, register indexes can not be changed. Thus, in such methods, register indexes are fixed. When programming in assembly language or high level languages (e.g., C language), compiling tools translate the code into the assemble language or high level languages into binary codes and fill the register index field. In this method, the codes access registers automatically through the register indexes designated statically. Such indexes and access manners for registers in the prior art result in many unnecessary overlapped memory accesses, and thus reducing the access speed of memories.

Moreover, none of instruction sets of any processors in the prior art has the instructions that access registers by using a source register as an index. However, such instructions are easily implemented and included in the existing instruction sets through additional simple hardware logic in existing pipeline according to the present invention.

There have been some methods and systems for accessing registers with indexes in the prior art. For example, a U.S. Pat. No. 5,995,727, titled "Method and Apparatus for Correlation of Events in a Distributed Multi-system Computing Environment", has disclosed a monitoring method and apparatus, in which there has been disclosed a solution that indexes are used to access some words or bits in a certain register, rather than using contents in a register as an index so as to access other registers. As another example, a U.S. Pat. No. 5,875,483, titled "Completion Unit Register File Using Virtual Addresses with Qualify and Pseudo-Address Bits", has mentioned an index of a register in a register file. However, the index is a traditional one, but not a value which uses contents of a register as an index to access other registers. There is still another example, a US Patent Application Serial No. 20060256854A1, which mentions a method for indexing registers in a single-instruction multiple-data processor. However, the operations of registers mentioned therein use new register numbers which can not be indexed by other registers, and further the method which uses contents of a register as an index to index other registers is not discussed.

SUMMARY OF THE INVENTION

To implement high processing speed of a processor and low power consumption caused by the hierarchy of processor and storage, one practical method is to utilize the access to a register file and to use the access result as an index to access the register file again, and the data and instructions are usually stored in higher levels of the hierarchy. One object of the present invention is to provide a method for implementing the above objects through using advantages of a register file in the highest level of said memory hierarchy.

An object of the present invention is to provide a data processing method and system based on pipeline.

One aspect of the present invention provides a data processing method based on pipeline, comprising the following steps: fetching an instruction at an instruction-fetch stage, and inputting a specific instruction into a decode stage, wherein said specific instruction indicating that contents of a register in a specific register file are to be utilized as an index; at the decode stage, accessing contents of the register in the specific register file, utilizing the contents as said index for accessing the specific register file, and accessing the specific register file again based on said index; and at an execution stage, receiving an access result of said decode stage, and implementing computations according to the access result of the decode stage.

Another aspect of the present invention provides a data processing system based on pipeline, comprising: an instruction-fetch stage where an instruction is fetched and a specific instruction is input into decode stage, wherein said specific instruction indicates that contents of a register in a specific register file are to be utilized as an index; a decode stage where contents of the register in the specific register file are accessed and utilized as said index to access the specific register file again; and an execution stage where an access result of said decode stage is received, and computations are implemented according to the access result of the decode stage.

Still another aspect of the present invention provides a data processing method. The method comprising: fetching a specific instruction, the specific instruction indicating that contents of a register in a specific register file are to be utilized as an index; obtaining said index by accessing the contents of the register in the specific register file; accessing the specific register file again based on said index; and providing an access result to an execution stage and implementing computations according to said access result.

BRIEF DESCRIPTION ON THE DRAWINGS

Other objects and effects of the present invention will become more clear and easy to be understood along with the whole understanding of the present invention through the description in combination with the drawings, in which.

DESCRIPTION OF THE PREFERRED EMBODIMENTS

Figure 1:
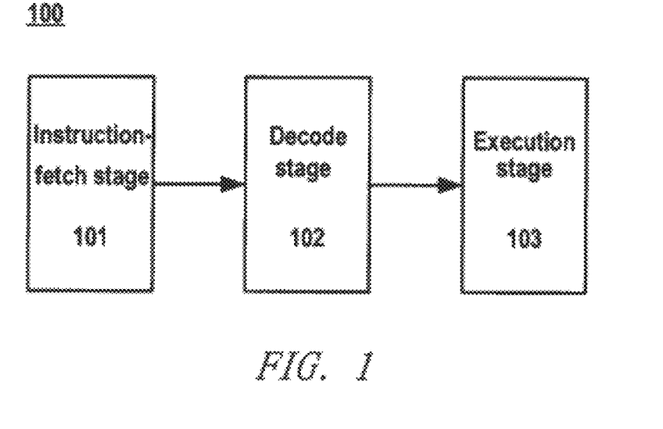
FIG. 1 shows a data processing system based on pipeline according to embodiments of the present invention.
Figure 2:
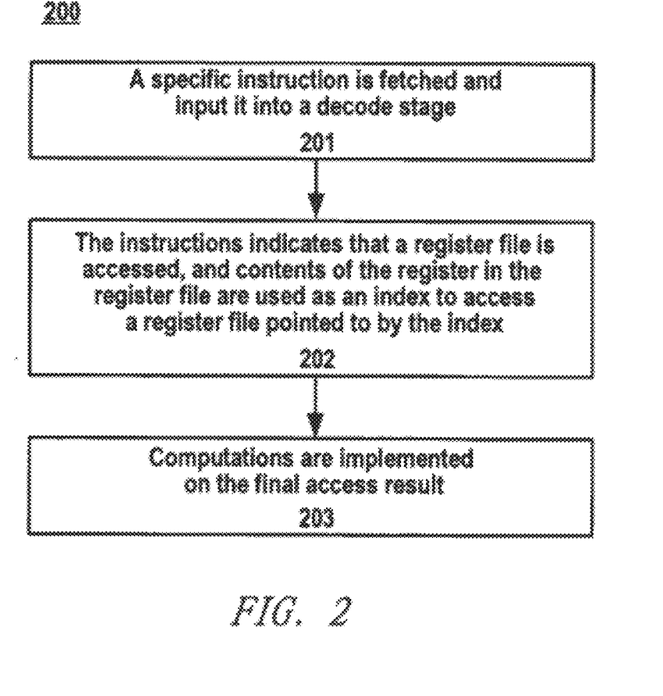
FIG. 2 is a flow chart showing a data processing method based on pipeline according to embodiments of the present invention.

FIG. 1 shows a data processing system 100 based on pipeline according to embodiments of the present invention. As shown in FIG. 1, the system 100 comprises an instruction-fetch stage 101 for fetching a specific instruction according to the present invention and inputting it into a decode stage 102; the decode stage 102 for receiving the specific instruction indicating that contents of a registers in a register file in the decode stage 102 are used as an index and then the register file pointed to by the index in the decode stage 102 is accessed based on the index; and an execution stage 103 for computing according to the access result of the decode stage. The system 100 of the present invention as shown in FIG. 1 may further comprise other execution stages, such as store stage, write back stage etc., and descriptions of such components can be omitted to avoid confusing the present invention. A flow chart of the method according to the present invention is shown in FIG. 2. FIG. 2 is a flow chart showing a data processing method based on pipeline according to embodiments of the present invention. At step 201, the specific instruction of the present invention is fetched at the instruction-fetch stage and then is input into the next decode stage. At step 202, the instruction arrives at the decode stage. The instruction indicates that one register file is accessed at first at the decode stage, and the contents of a register in the register file are used as an index by which the register file pointed to is accessed, wherein the register file pointed to by the index can be the previously accessed register file or another one. The index can be created, changed and managed in a dynamic way as needed. The data processing system and method based on pipeline of the present invention reduce the access times of memories and power consumption of the processor, and make the access management of data in a register file more quick and dynamic by using contents in a register as an index.

Figure 3:
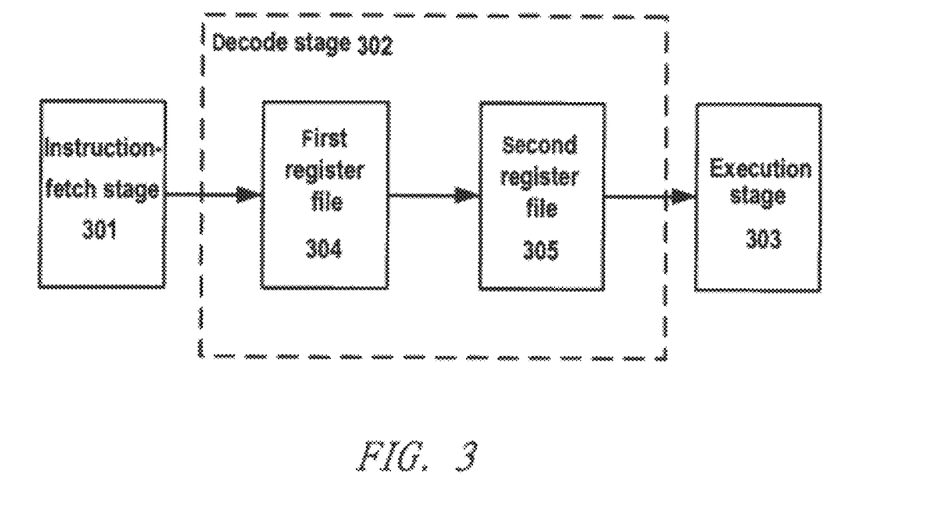
FIG. 3 is an implementation of a configuration of the system according to a first embodiment of the present invention.

FIG. 3 is an implementation of a configuration of the system according to a first embodiment of the present invention. As shown in FIG. 3, the configuration of the system 300 preferably comprises an instruction-fetch stage 301, a decode stage 302 and an execution stage 303. The decode stage 302 comprises a first register file 304 and a second register file 305 both of which have identical contents. The system is specifically implemented as follows: at the instruction-fetch stage 301, a specific instruction of the present invention is fetched and input into the decode stage 302. At the decode stage 302, the instruction is entered into the first register file 304. Some bit field of the instruction is used as an index to access the first register file 304. Contents of the indexed register in the first register file 304 are used as an index pointing to the second register file 305, and then the second register file 305 is further accessed based on the index constructed from the contents of the indexed register in the first register file 304. At the execution stage 303, computations are implemented according to the access result of the second register file 305.

Figure 4:
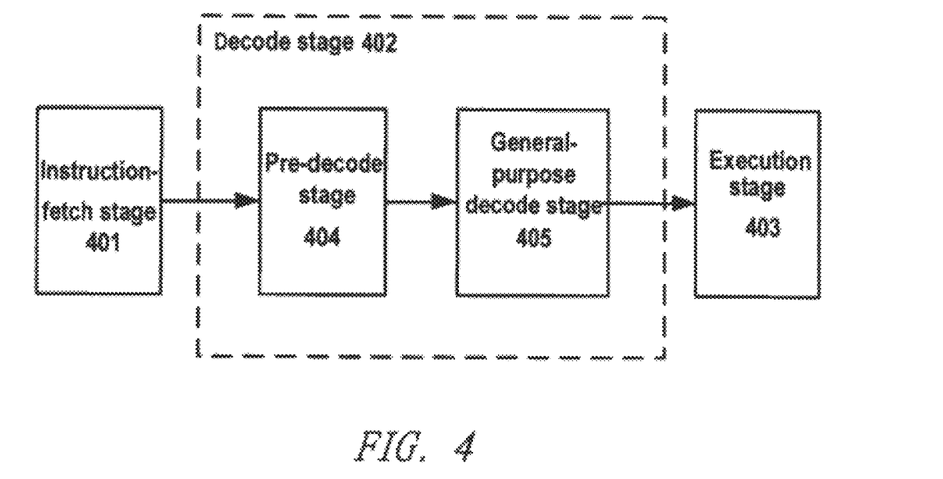
FIG. 4 is an implementation of a configuration of the system according to a second embodiment of the present invention.

In the above embodiment, at the decode stage 302, there will be latency during decoding operation at the decode stage 302 since two register files are accessed. Therefore, the present invention provides another improved implementation, as shown in FIG. 4. FIG. 4 is an implementation of a configuration of the system according to a second embodiment of the present invention. Preferably, the configuration of the system 400 comprises an instruction-fetch stage 401, a decode stage 402 and an execution stage 403. The decode stage 402 comprises a pre-decode stage 404 and a general-purpose decode stage 405. The system is specifically implemented as follows: at the instruction-fetch stage 401, a specific instruction of the present invention is fetched and input into the decode stage 402. At the decode stage 402, the instruction is entered into the pre-decode stage 404. At the pre-decode stage 404, the instruction is entered into the pre-decode phase, and in the pre-decode stage 404, some bit field of the instruction is used as an index to access a source register file and the contents of the accessed register are used as an index. And then, in the general-purpose decode stage 405, the general-purpose decode phase is entered, that is, the index constructed from the contents of the register in the source register file is used to further access the general-purpose register file in the general-purpose decode stage 405 pointed to by the index. The operations of general-purpose decode stage 405 are similar to those of the traditional decode stage. At the execution stage 403, computations are implemented according to the access result of the general-purpose register file. In this embodiment, because this kind of instructions must access the general-purpose register file twice in two consecutive clocks, the succeeding instructions only have to delay for one clock. Therefore, the embodiment results in a lower latency as compared with the embodiment shown in FIG. 3.

Figure 5:
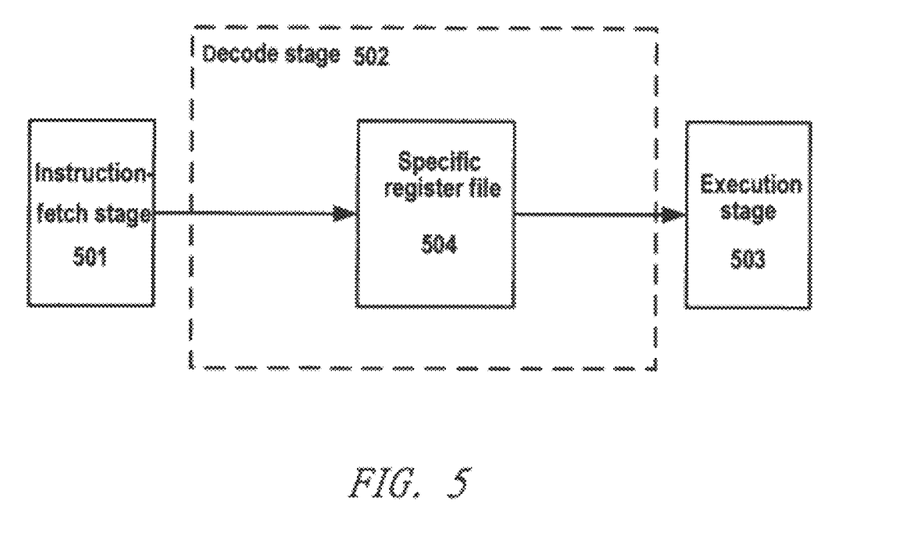
FIG. 5 is an implementation of a configuration of the system according to a third embodiment of the present invention.

In the above implementations, the used register files are traditional general-purpose register files with a simple implementation, which are convenient and quick, but have some latency. The present invention therefore further provides a data processing system configuration based on pipeline, which uses a specific register file, to optimize the present invention. FIG. 5 is an implementation of a configuration of the system according to a third embodiment of the present invention. As shown in FIG. 5, the system configuration 500 preferably comprises an instruction-fetch stage 501, a decode stage 502 and an execution stage 503. The decode stage 502 comprises a specific register file 504. The specific register file 504 can implement the function of the present invention that uses contents of a register in a register file as an index and further accesses the register file based on the index. The system is specifically implemented as follows: at the instruction-fetch stage 501, a specific instruction of the present invention is fetched and input into the decode stage 502. At the decode stage 502, the instruction is passed through the specific register file 504, some bit field of the instruction is used as an index to access contents of a register in the specific register file 504 and use the contents as an index which still points to the specific register file 504, and then the specific register file 504 is accessed again based on the index constructed from the contents of the register in the specific register file, thereby acquiring the final access result. At the execution stage 503, computations are implemented according to the access result of the specific register file 504. In this embodiment, the latency is further lower as compared with those of the above embodiments, as the processing procedure can be implemented in one clock.

Figure 6:
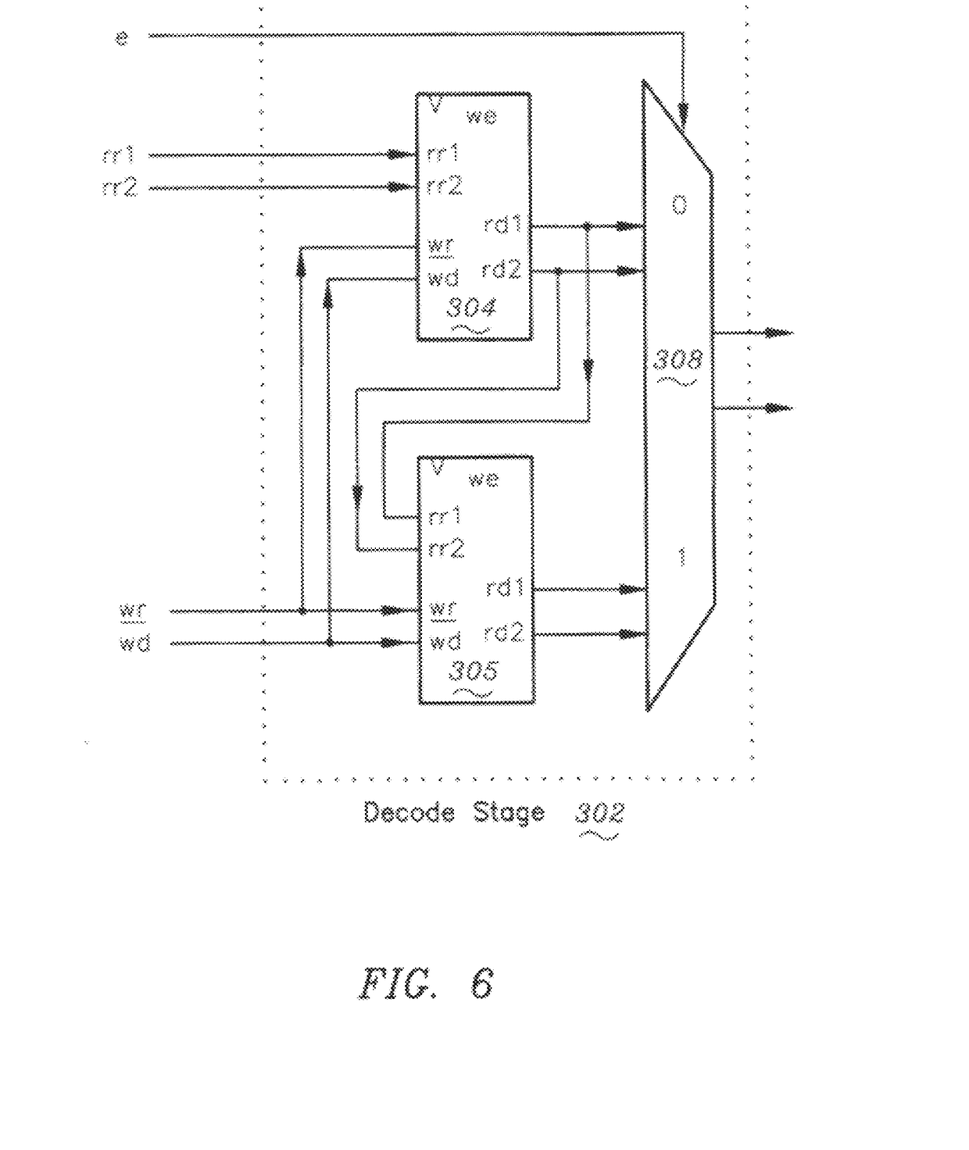
FIG. 6 is a detailed schematic diagram of the decode stage according to the first embodiment of the present invention.

FIG. 6 is a detailed schematic diagram of the decode stage 302 according to the first embodiment of the present invention. In the example, there is shown an implementation combining two modes, in which both traditional instructions and specific instructions of the present invention can be accepted. As discussed above, the decode stage 302 according to the first embodiment of the present invention comprises the first register file 304 and the second register file 305, both of which have identical contents. In this example, the instruction is entered into the first register file 304 for example from input ports rr1 and rr2 of the first register file 304 to access the first register file 304 so as to gain read data at output ports rd1 and rd2. The read data are input into a multiplexor 308 and the second register file 305. The data read from the first register file 304 are for example input into the input ports rr1 and rr2 of the second register file 305 as an index by the second register file 305. Thereafter, the second register file 305 is accessed based on the index formed from the data read from the first register file 304, and then another read data are gained at its output ports rd1 and rd2 and also input into the multiplexer 308. A control input e (extension) is connected to the multiplexer 308, a 2-to-1 multiplexor. When the instruction is a traditional one, the control input e equals to 0, and thus the multiplexor 308 outputs the read data from the first register file 304, thereby implementing the traditional instruction access process; while when the instruction is specific one of the present invention, the control input e equals to 1, and thus the multiplexor 308 outputs another read data from the second register file 305, thereby implementing the register access process with contents of the register file as an index according to the present invention. Thereafter, the output of multiplexor 308 will be input to the execution stage 303 for the subsequent computations.

Figure 7:
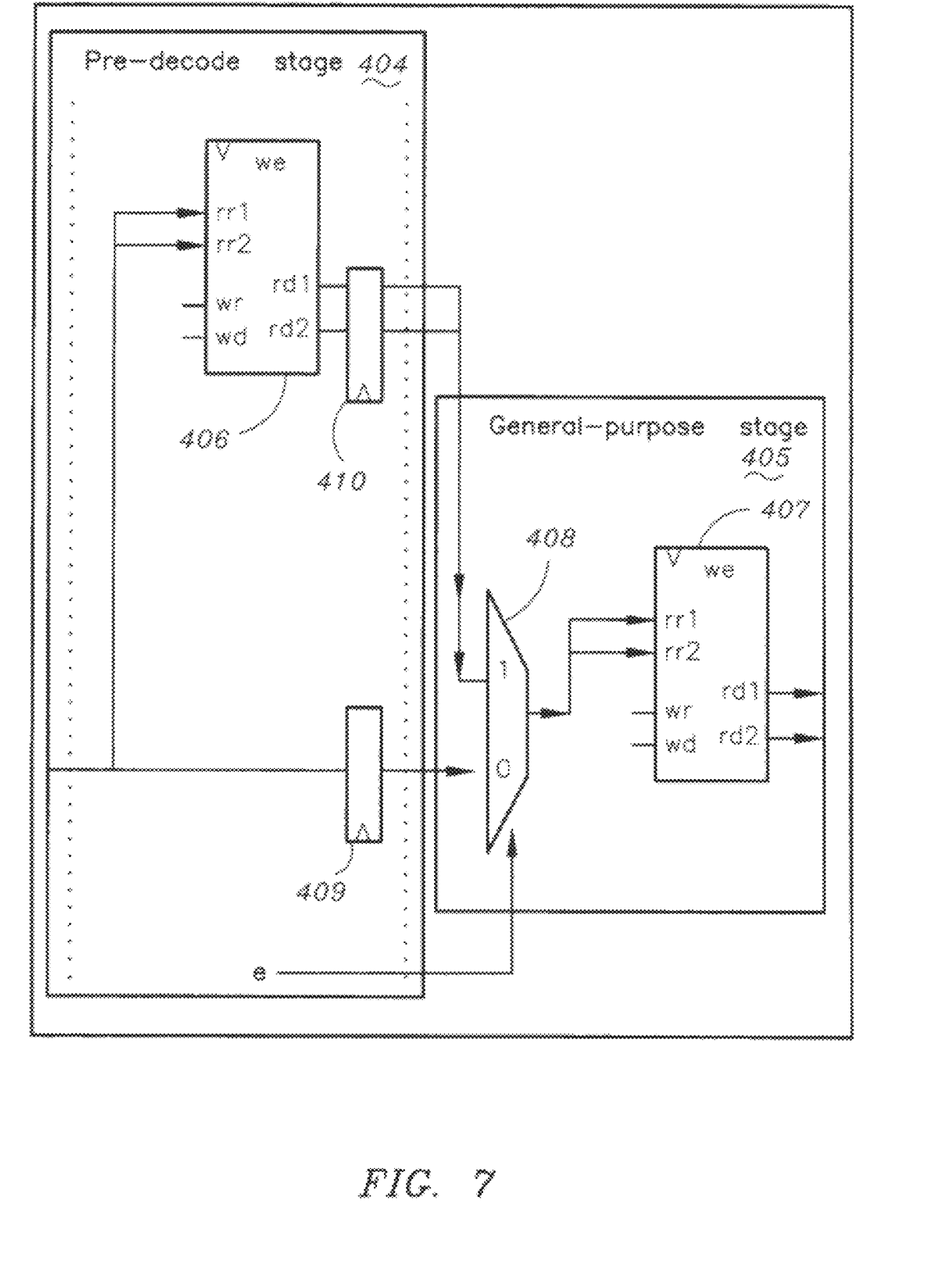
FIG. 7 is a detailed schematic diagram of the decode stage according to the second embodiment of the present invention.

FIG. 7 is a detailed schematic diagram of the decode stage 402 according to the second embodiment of the present invention. In the example, there is also shown an implementation combining two modes, in which both traditional instructions and specific instructions of the present invention can be accepted. The decode stage 402 according to the second embodiment of the present invention comprises a pre-decode stage 404 and a general-purpose decode stage 405. In the pre-decode stage 404, there exists one register file 406. In the general-purpose decode stage 405, there exists one register file 407. In this example, the instruction is for example input into input ports rr1 and rr2 of the register file 406. And then the instruction is input into the multiplexor 408 of the general-purpose decode stage 405 through a first latch 409. The instruction is input into the register file 404 to access the register file 404 and then read data are gained at its output ports rd1 and rd2. As a separate pipeline, there is included a second latch 410 after the register file 404 of the pre-decode stage to latch the output data, and the output data are input into the multiplexor 408 of the general-purpose decode stage 405. Also, a control input e (extension) is connected to the multiplexer 408, a 2-to-1 multiplexor. When the instruction is a traditional one, the control input e equals to 0, and thus the multiplexor 408 outputs the traditional instruction latched by the first latch 409. The instruction is then input from the multiplexor 408 to input ports rr1 and rr2 of the register file 407 in the general-purpose decode stage 405, and then read data are output from output ports rd1 and rd2 of the register file 407, thereby implementing traditional instruction access process; while when the instruction is specific one of the present invention, the control input e equals to 1, and thus the multiplexor 408 outputs read data from the register file 406 of the pre-decode stage 404. The read data are input to the register file 407 of the general-purpose stage 405 later. The read data is input into the input ports rr1 and rr2 of the register file 407 as an index from the register file 406. The register file 407 is accessed based on the index formed from the read data output from the register file 406, and then another read data are gained at its output ports rd1 and rd2, thereby implementing the register access process with contents of the register file as an index according to the present invention. Thereafter, the output of register file 407 will be input to the execution stage 403 for the subsequent computations.

Figure 8:
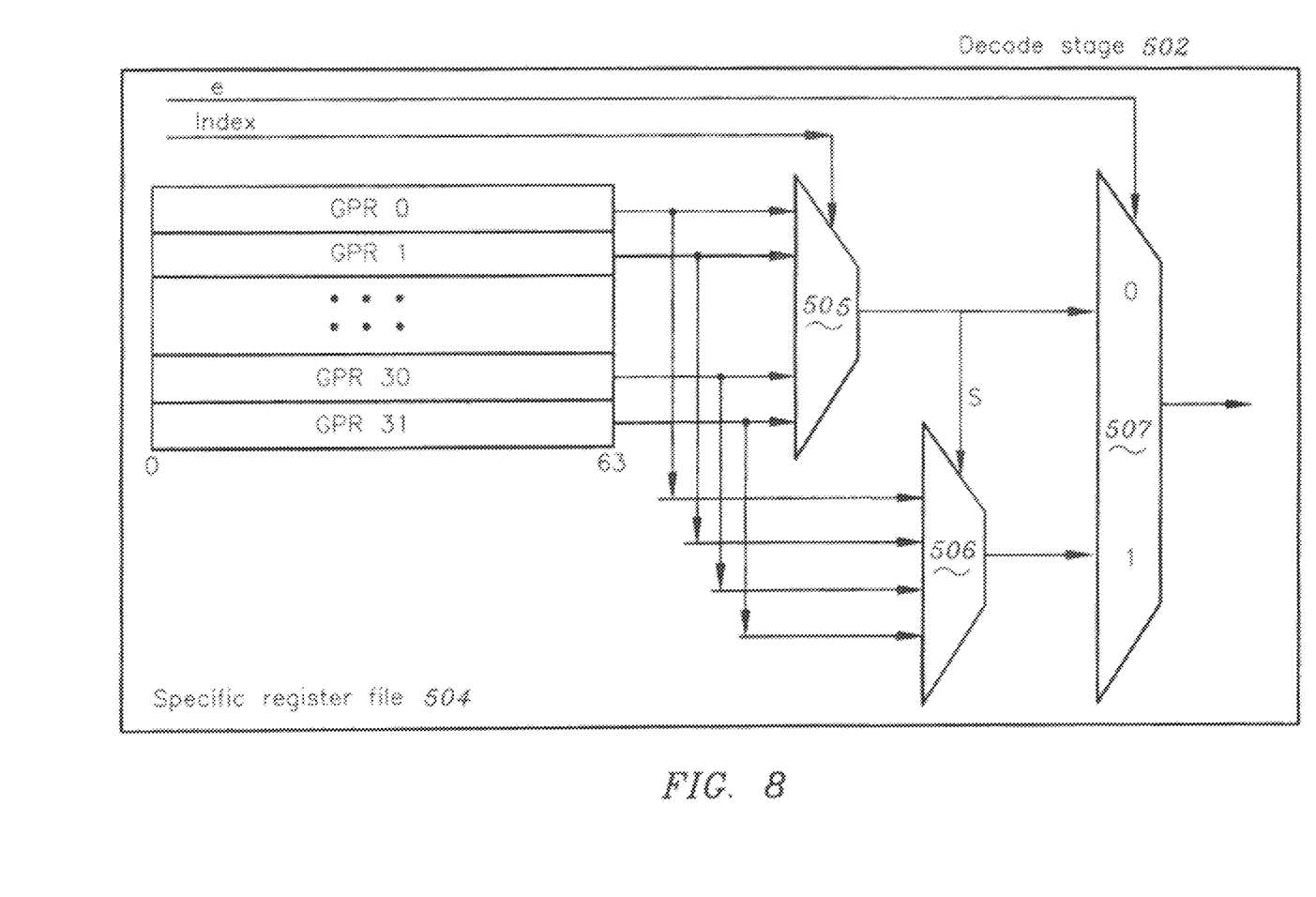
FIG. 8 is a detailed schematic diagram of the decode stage according to the third embodiment of the present invention.

FIG. 8 is a detailed schematic diagram of the decode stage 502 according to the third embodiment of the present invention. In the example, there is also shown an implementation combining two modes, in which both traditional instructions and specific instructions of the present invention can be accepted. As described above, the decode stage 502 according to the third embodiment of the present invention comprises a specific register file 504. The specific construction and operation principle of the specific register file 504 are as follows. As an example, the specific register file 504 comprises 32 general-purpose registers GPR0, GPR1 ... GPR31. Their outputs are connected to a first multiplexor 505 and a second multiplexor 506, and their outputs are in turn connected to a third multiplexor 507. Additionally, the output of the first multiplexor 505 is connected to the second multiplexor 506 as a control input to control the output of the second multiplexor 506. An index input, index, is connected to the first multiplexor 505. The control input e (extension) is connected to the third multiplexor 507. When the index input index is n, the read data x from a general-purpose register GRPn is output by the first multiplexor 505 and then input into the input of the third multiplexor 507, and the data x is further input into the second multiplexor 506 as a control input. Thus, the second multiplexor 506 selects read data y from the general-purpose register GPRm to input into the input of the third multiplexor 507. When the instruction is traditional instruction, the control input e of the third multiplexor 507 equals to 0, and thus the third multiplexor 507 outputs the read data x from the general-purpose register GPRn input from the first multiplexor 505 finally, thereby implementing traditional instruction access process; when the instruction is a specific one of the present invention, the control input e equals to 1, and thus the third multiplexor 507 outputs the read data y from the general-purpose GRPm input from the second multiplexor 506, thereby implementing the register access process with contents of the register file as an index according to the present invention. Thereafter, the output of third multiplexor 507 will be input into the execution stage 503 for the subsequent computations.

Figure 9:
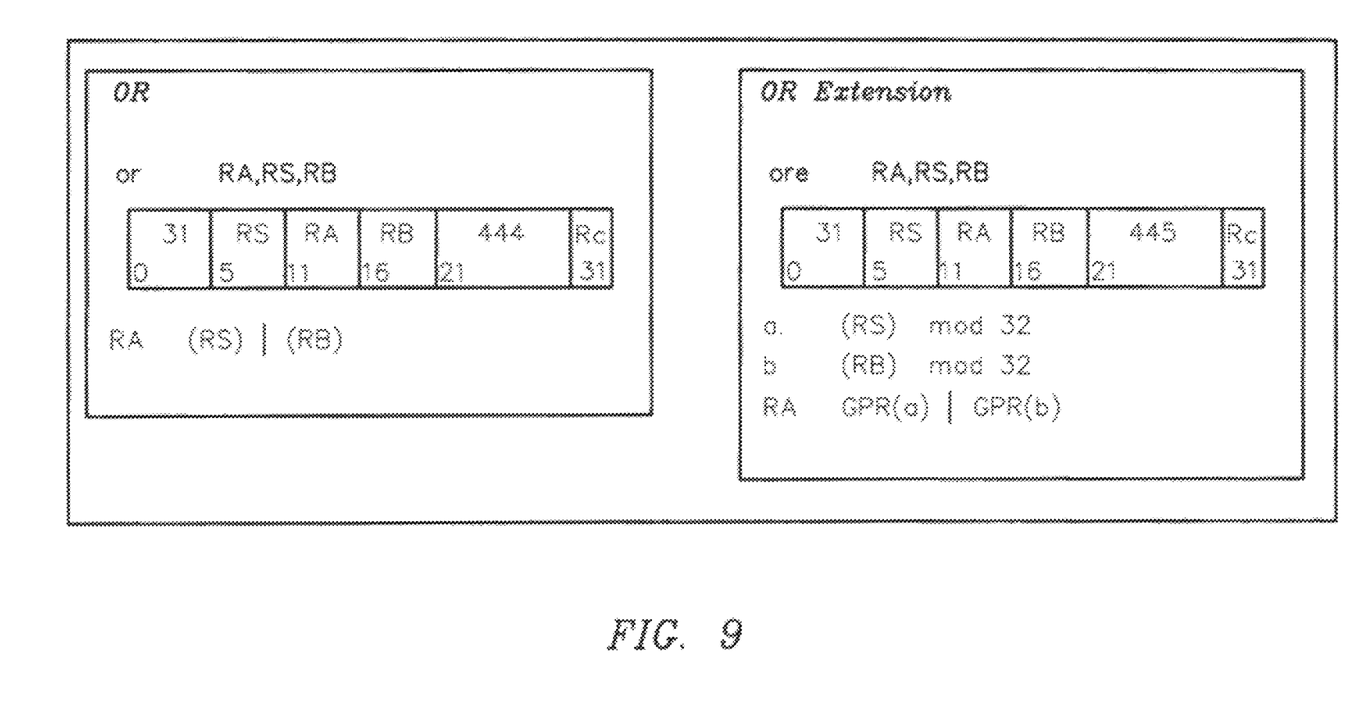
FIG. 9 is a particular application of a data processing system based on pipeline according to embodiments of the present invention.

FIG. 9 is a specific application of embodiments according to the present invention, in which there is presented examples of a specific instruction of the present invention. The specific instruction can access a register file through using contents of a source register file as an index. In FIG. 9, the application of the present invention is described with the specific instruction, but it can be understood that the present invention can be applied to any types of instructions in the register file, for example, moving register, i.e., copying contents of the source register to a target register and the like. As shown in FIG. 9, a traditional instruction is represented as: or RA, RS, RB. The traditional instruction and method are to implement "or" computation on the contents in the register RS and those in the register RB, and put the computed result into the register RA. However, the specific instruction and method of the present invention are implemented as follows: the specific instruction is represented as: ore RA, RS, RB. With the method according to the present invention, the specific instruction indicates that the contents in the register RS are used as an index, "or" computation is implemented on the contents in the register RS and those in the register RB, and the computed result is put into the register RA. Therefore, as compared with the traditional instruction, the specific instruction and method of the present invention improve the performance of many application programs. Moreover, the new specific instruction is compatible with the previous traditional instruction. Accordingly, old executable programs can be easily imported into a new processor system. The method and system of the present invention can be applied to other instruction accesses in the register file as well, for example, move instruction, load instruction and the like.

It can be seen that contents in register files can be accessed quickly and dynamically with the data processing method and system based o pipeline of the present invention, thereby reducing access times of the processor and accelerating the processing speed of the processor.

It should be noted that, in order to make the present invention easier to be understood, the above-mentioned description omits some technical details which have been known to those skilled in the art and are necessary for implementing the present invention.

The purpose of providing descriptions of the present invention is only to illustrate and describe, but not to exhaust the present invention or limit the present invention to what is described herein. For those skilled in the art, many modifications and variations are obvious.

Accordingly, the selection and description of embodiments are for one understanding principles of the present invention and its practical applications better It is intended to make those skilled in the art understand that all modifications and changes will fall within the protection scope of the present invention which is defined by the claims without departing from essences of the present invention.

The invention claimed is:

1. A data processing method based on pipeline, comprising the following steps:
    fetching an instruction at an instruction-fetch stage, and inputting a specific instruction into a decode stage, wherein said specific instruction indicating whether contents of a register in a specific register file are to be utilized as an index;
    at the decode stage, accessing contents of the register in the specific register file, utilizing the contents as said index for accessing the specific register file, and accessing the specific register file based on said index; and
    at an execution stage, receiving an access result of said decode stage, and implementing computations according to the access result of the decode stage,
    wherein said specific register file includes multiple general-purpose registers and said accessing the specific register file further comprises:
        providing access to said multiple general-purpose registers using a first multiplexor;
        providing access to said multiple general-purpose registers using a second multiplexor; and
        providing an output of said first multiplexor as a control input to said second multiplexor and as an input to a third multiplexor, wherein: the output of said first multiplexor and the output of said second multiplexor are provided to the third multiplexor simultaneously for selection; when said specific instruction does not indicate the contents of the register in the specific register file are to be utilized as the index, the third multiplexor selects to output to the execution stage the output of said first multiplexor; and when said specific instruction indicates the contents of the register in the specific register file are to be utilized as the index, the third multiplexor selects to output to the execution stage the output of said second multiplexor.

2. The method of claim 1, wherein said accessing said multiple general-purpose registers using a first multiplexor and said accessing said multiple general-purpose registers using a second multiplexor are carried out in parallel.

3. The method of claim 2, wherein the output of said first multiplexor is a result acquired through accessing contents of the register in the specific register file as indicated in said specific instruction.

4. The method of claim 2, wherein the output of said second multiplexor is a result acquired through accessing the specific register file based on said index.

5. A data processing system based on pipeline, comprising:
    an instruction-fetch stage where an instruction is fetched and a specific instruction is input into decode stage, wherein said specific instruction indicates whether contents of a register in a specific register file are to be utilized as an index;
    a decode stage where contents of the register in the specific register file are accessed and utilized as said index to access the specific register file; and
    an execution stage where an access result of said decode stage is received, and computations are implemented according to the access result of the decode stage,
    wherein said specific register file comprises multiple general-purpose registers, a first multiplexor, a second multiplexor and a third multiplexor, wherein outputs of said multiple general-purpose registers are connected to inputs of said first multiplexor and said second multiplexor, and the output of said first multiplexor is connected to a control input of said second multiplexor and an input of the third multiplexor, and wherein: the output of said first multiplexor and the output of said second multiplexor are provided to the third multiplexor simultaneously for selection; when said specific instruction does not indicate the contents of the register in the specific register file are to be utilized as the index, the third multiplexor selects to output to the execution stage the output of said first multiplexor; and when said specific instruction indicates the contents of the register in the specific register file are to be utilized as the index, the third multiplexor selects to output to the execution stage the output of said second multiplexor.

6. The system of claim 5, wherein said first multiplexor and said second multiplexor are configured for accessing said multiple general-purpose registers in parallel.

7. The system of claim 6, wherein the output of said first multiplexor is a result acquired through accessing contents of the register in the specific register file as indicated in said specific instruction.

8. The system of claim 6, wherein the output of said second multiplexor is a result acquired through accessing the specific register file based on said index.

9. A data processing method, comprising:
fetching a specific instruction, the specific instruction indicating whether contents of a register in a specific register file are to be utilized as an index;
accessing the contents of the register in the specific register file using a first multiplexor;
accessing the same specific register file using a second multiplexor;
providing an output of said first multiplexor as a control input to said second multiplexor and as an input to a third multiplexor, wherein: the output of said first multiplexor and the output of said second multiplexor are provided to the third multiplexor simultaneously for selection; when said specific instruction does not indicate the contents of the register in the specific register file are to be utilized as the index, the third multiplexor selects the output of said first multiplexor as an access result; and when said specific instruction indicates the contents of the register in the specific register file are to be utilized as the index, the third multiplexor selects the output of said second multiplexor as the access result; and
providing the access result to an execution stage and implementing computations according to said access result.

10. The method of claim 9, wherein said accessing the contents of the register in the specific register file using the first multiplexor and said accessing the same specific register file using the second multiplexor are carried out in parallel.

11. The method of claim 10, wherein when said specific instruction does not indicate the contents of the register in the specific register file are to be utilized as the index, the output of said second multiplexor is discarded.

12. The method of claim 10, wherein when said specific instruction indicates the contents of the register in the specific register file are to be utilized as the index, the output of said first multiplexor is utilized as the index for selecting the output of said second multiplexor.

* * * * *